(12) United States Patent
Onay et al.

(10) Patent No.: US 12,584,770 B2
(45) Date of Patent: Mar. 24, 2026

(54) H-BRIDGE PUSH-PULL EXCITATION CIRCUIT FOR A TRANSFORMER-BASED MEASURING DEVICE

(71) Applicant: MICROCHIP TECHNOLOGY INCORPORATED, Chandler, AZ (US)

(72) Inventors: Halil Alper Onay, Ennis (IE); Laurence Egan, Ennistymon (IE)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 237 days.

(21) Appl. No.: 18/205,227

(22) Filed: Jun. 2, 2023

(65) Prior Publication Data

US 2024/0337511 A1     Oct. 10, 2024

Related U.S. Application Data

(60) Provisional application No. 63/494,379, filed on Apr. 5, 2023.

(51) Int. Cl.
*G01D 5/22*     (2006.01)

(52) U.S. Cl.
CPC ................................. *G01D 5/2291* (2013.01)

(58) Field of Classification Search
None
See application file for complete search history.

(56) References Cited

U.S. PATENT DOCUMENTS

| | | | |
|---|---|---|---|
| 2005/0189988 A1* | 9/2005 | Killian | H03F 3/45071 330/6 |
| 2007/0194850 A1* | 8/2007 | Lin | H03F 3/45183 330/292 |
| 2017/0138767 A1* | 5/2017 | Sohler | G01D 5/2291 |
| 2021/0099016 A1* | 4/2021 | Bhandarkar | H02J 50/12 |
| 2022/0042827 A1* | 2/2022 | Bruckhaus | G01D 5/204 |

OTHER PUBLICATIONS

International Search Report and Written Opinion dated Feb. 28, 2024 for International Application No. PCT/US2023/078683 filed Nov. 3, 2023.
"1.5A Dual High-Speed Power MOSFET Drivers", Microchip Technology Inc., 2022, pp. 1-28.
Sangster, S., "TC4426/27/28 System Design Practice", Microchip Technology Inc., 2002, pp. 1-8.
International Preliminary Report on Patentability issued on Oct. 16, 2025, in corresponding International Application No. PCT/US2023/078683 (7 pages).

* cited by examiner

*Primary Examiner* — Nasima Monsur
(74) *Attorney, Agent, or Firm* — Shumaker, Loop & Kendrick, LLP; Ryan M. Corbett

(57) ABSTRACT

An excitation circuit is provided for a transformer-based measuring device that includes an excitation coil. The excitation circuit includes an H-bridge circuit and a compensation circuit. The H-bridge circuit is to convert a unipolar square wave signal to a bipolar square wave signal to drive the excitation coil. The H-bridge circuit includes push-pull amplifiers arranged in two legs. The compensation circuit is coupled between the two legs of the H-bridge circuits, and compensates for any distortion in the bipolar square wave signal caused by the excitation coil as an inductive load on the H-bridge circuit.

26 Claims, 13 Drawing Sheets

1100

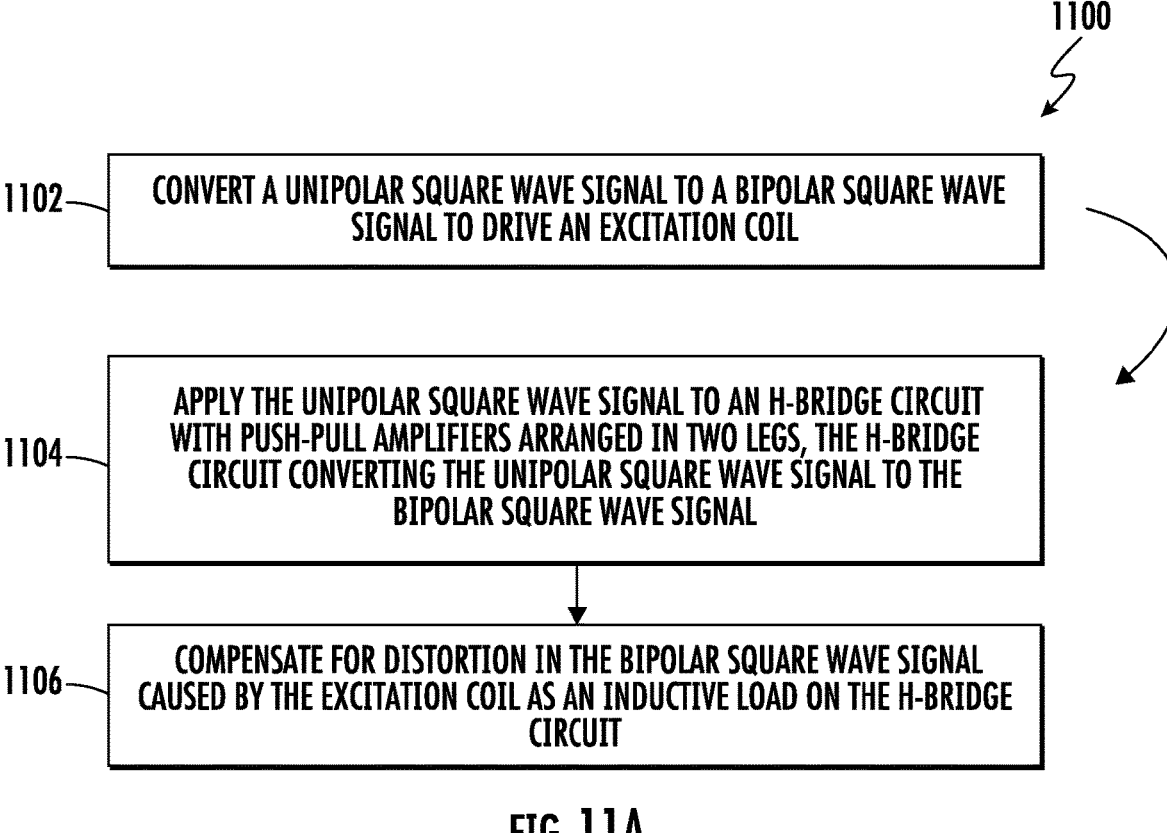

1102 — CONVERT A UNIPOLAR SQUARE WAVE SIGNAL TO A BIPOLAR SQUARE WAVE SIGNAL TO DRIVE AN EXCITATION COIL

1104 — APPLY THE UNIPOLAR SQUARE WAVE SIGNAL TO AN H-BRIDGE CIRCUIT WITH PUSH-PULL AMPLIFIERS ARRANGED IN TWO LEGS, THE H-BRIDGE CIRCUIT CONVERTING THE UNIPOLAR SQUARE WAVE SIGNAL TO THE BIPOLAR SQUARE WAVE SIGNAL

1106 — COMPENSATE FOR DISTORTION IN THE BIPOLAR SQUARE WAVE SIGNAL CAUSED BY THE EXCITATION COIL AS AN INDUCTIVE LOAD ON THE H-BRIDGE CIRCUIT

FIG. 11A

1108 — PROCESS THE OUTPUT SIGNALS TO DETERMINE THE POSITION OF THE OBJECT

FIG. 11B

H-BRIDGE PUSH-PULL EXCITATION CIRCUIT FOR A TRANSFORMER-BASED MEASURING DEVICE

CROSS-REFERENCE TO RELATED APPLICATION(S)

The present application claims priority to U.S. Provisional Patent Application No. 63/494,379, entitled: H-Bridge Push-Pull Excitation Circuit for a Transformer-Based Measuring Device, filed on Apr. 5, 2023, the content of which is hereby incorporated by reference in its entirety.

TECHNOLOGICAL FIELD

The present disclosure relates generally to position sensors and, in particular, to a position sensor including an excitation circuit for a transformer-based measuring device.

BACKGROUND

A number of transformer-based measuring devices have been developed to detect the position of an object. One type of transformer-based measuring device is a resolver used to detect angular position. Another type of transformer-based measuring device is a linear variable differential transformer used to detect linear position.

A resolver, in particular, is a type of electrical device used to detect the angular position of a rotating object such as a motor shaft. It is a type of rotary transformer that works by modulating the amplitude of a carrier waveform according to an angular position of the rotating object. The ability of a resolver to measure angular position makes it ideal for a variety of aerospace, automotive, industrial, medical and military applications.

In aerospace, resolvers are used to detect the position of aircraft control surfaces such as ailerons, flaps, rudders, and elevators. They can also be used to measure the position of the engines, propellers, and other components. Resolvers are used in the navigation and guidance systems of unmanned aerial vehicles (UAVs) and satellites.

In addition to their use in aerospace, resolvers are used in many other industries. They are used in automotive applications to detect the position of the steering wheel, brakes, and transmission. In industrial applications, they are used to measure the position of conveyor belts, cranes, and other industrial machinery. In medical applications, resolvers are used to measure the position of robotic arms used in surgical procedures.

Sensors that include a resolver typically include excitation circuitry to drive an excitation coil of the resolver that causes output signals picked up by sensing coils, which may be used to determine angular position. Many conventional resolver excitation circuits include operational amplifiers such as inverting and non-inverting amplifiers. But when a particular application for the sensor calls for square-wave excitation, these excitation circuits may produce a bipolar signal with slightly different positive and negative amplitudes because of different characteristics and tolerances of inverting and non-inverting amplifiers. These conventional excitation circuits are also often complex, including high numbers of components that decrease their reliability.

It would therefore be desirable to have a system and method that takes into account at least some of the issues discussed above, as well as other possible issues.

BRIEF SUMMARY

Example implementations of the present disclosure are directed to position sensors and, in particular, to transformer-based measuring devices (e.g., resolver or linear variable differential transformer, without limitation) including an H-bridge push-pull excitation circuit. In this regard, example implementations provide an excitation circuit with an H-bridge circuit that includes push-pull amplifiers arranged in two legs. Push-pull amplifiers are often used for capacitive loading; but in the excitation circuit of example implementations, the push-pull amplifiers are used with an inductive load of the excitation coil of the resolver. The excitation circuit may therefore also include a compensation circuit to compensate for any distortion in its output signal caused by the excitation coil as an inductive load on the H-bridge circuit.

The H-bridge circuit including push-pull amplifiers may reduce the complexity and number of components in the excitation circuit, which may increase reliability of the excitation circuit. The H-bridge circuit may also enable the circuit to produce a bipolar output signal with equal (or substantially equal) positive and negative amplitudes.

The present disclosure thus includes, without limitation, the following example implementations.

Some example implementations provide a position sensor comprising: a transformer-based measuring device connectable to an object that is movable, the transformer-based measuring device including an excitation coil and a plurality of sensing coils; and an excitation circuit to convert a unipolar square wave signal to a bipolar square wave signal to drive the excitation coil to generate an alternating magnetic field and induce output signals in the plurality of sensing coils that vary according to a position of the object, the excitation circuit including: an H-bridge circuit including push-pull amplifiers arranged in two legs, the H-bridge circuit to convert the unipolar square wave signal to the bipolar square wave signal; and a compensation circuit coupled between the two legs of the H-bridge circuit, the compensation circuit to compensate for any distortion in the bipolar square wave signal caused by the excitation coil as an inductive load on the H-bridge circuit.

Some example implementations provide an excitation circuit comprising: an H-bridge circuit to convert a unipolar square wave signal to a bipolar square wave signal to drive an excitation coil of a transformer-based measuring device, the H-bridge circuit including push-pull amplifiers arranged in two legs; and a compensation circuit coupled between the two legs of the H-bridge circuit, the compensation circuit to compensate for any distortion in the bipolar square wave signal caused by the excitation coil as an inductive load on the H-bridge circuit.

Some example implementations provide an excitation circuit comprising: a gate drive circuit to convert a unipolar square wave signal to a bipolar square wave signal to drive an excitation coil of a transformer-based measuring device, the gate drive circuit including a non-inverting gate driver and an inverting gate driver that are arranged in two legs to implement an H-bridge circuit; and a compensation circuit coupled between the two legs of the H-bridge circuit, the compensation circuit to compensate for any distortion in the bipolar square wave signal caused by the excitation coil as an inductive load on the H-bridge circuit.

Some example implementations provide a method comprising: converting a unipolar square wave signal to a bipolar square wave signal to drive an excitation coil, converting the unipolar square wave signal including: applying the unipolar square wave signal to an H-bridge circuit with push-pull amplifiers arranged in two legs, the H-bridge circuit converting the unipolar square wave signal to the bipolar square wave signal; and compensating for distortion in the bipolar square wave signal caused by the excitation coil as an inductive load on the H-bridge circuit.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIGS. 11A and 11B are flowcharts of a method according to various example implementations.

DETAILED DESCRIPTION

Figure 1A:
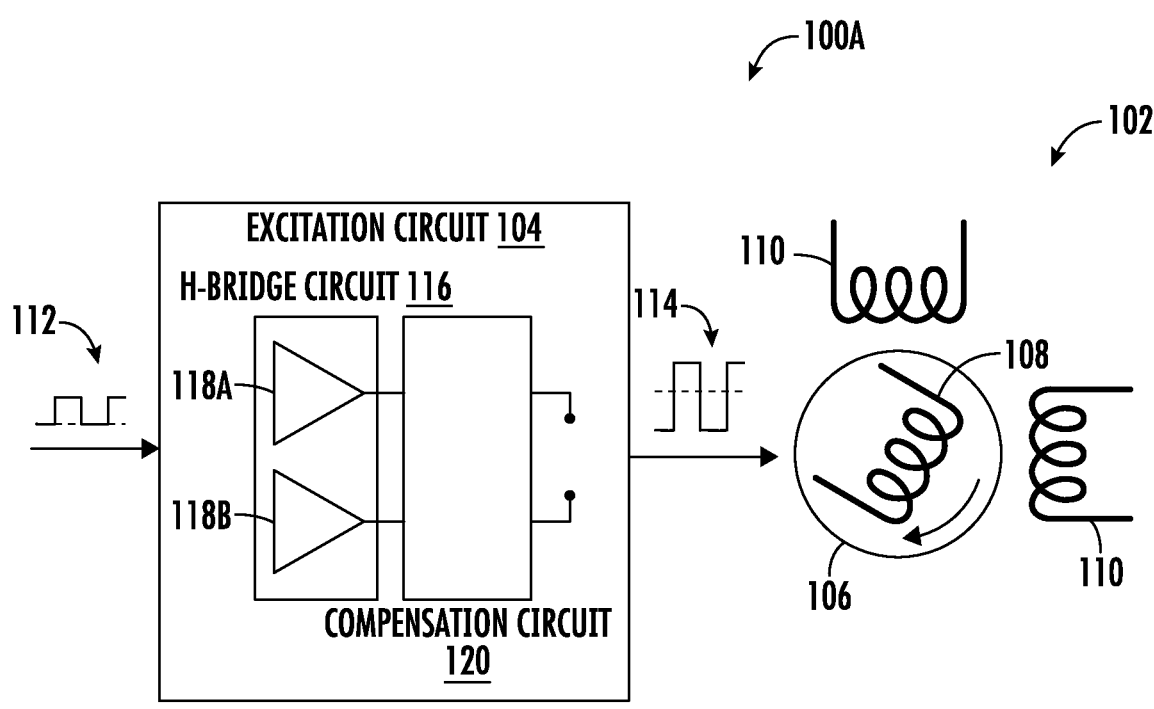
FIG. 1A is a block diagram of a position sensor including an excitation circuit including an H-bridge circuit with push-pull amplifiers arranged in two legs, and a compensation circuit coupled between the two legs, according to some example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may approximate to account for acceptable variations that may occur, such as those due to engineering tolerances or the like.

As used herein, unless specified otherwise or clear from context, the "or" of a set of operands is the "inclusive or" and thereby true if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to position sensors and, in particular, to a position sensor including an excitation circuit for a transformer-based measuring device.

FIG. 1A is a block diagram of a position sensor 100A for measuring a position of an object that is movable, according to some example implementations of the present disclosure. As shown, the position sensor includes a transformer-based measuring device 102 and an excitation circuit 104. The transformer-based measuring device is connectable to the object 106. The transformer-based measuring device includes an excitation coil 108 and a plurality of sensing coils 110. In some examples, the transformer-based measuring device is a resolver that includes a rotor connectable to a shaft (the object 106) that is rotatable. In other examples, the transformer-based measuring device is a linear variable differential transformer (LVDT) that includes a core connectable to the object 106 that is linearly movable.

The excitation circuit 104 may convert a unipolar square wave signal 112 to a bipolar square wave signal 114 to drive the excitation coil 108 of the transformer-based measuring device 102 to generate an alternating magnetic field and induce output signals in the plurality of sensing coils 110 that vary according to a position of the object 106. In the case of a resolver, the output signals may vary according to an angular position of the rotor and thereby the object 106;

and in the case of a LVDT, the output signals may vary according to a linear position of the core and thereby the object 106.

In some examples, the excitation circuit 104 includes an H-bridge circuit 116 with push-pull amplifiers 118A, 118B arranged in two legs. The H-bridge circuit may convert the unipolar square wave signal 112 to the bipolar square wave signal 114. As indicated in the summary section, the push-pull amplifiers 118A, 118B of the excitation circuit 104 are used with an inductive load of the excitation coil 108 of the transformer-based measuring device 102. The excitation circuit 104 may therefore also include a compensation circuit 120 to compensate for any distortion in the bipolar square wave signal 114 caused by the excitation coil 108 as an inductive load on the H-bridge circuit 116. In this regard, the compensation circuit may compensate for inductive lag in current in the push-pull amplifiers 118A, 118B. The lag in current causes distortion in the bipolar square wave signal 114, due to interactions with the push-pull amplifiers 118A, 118B. In this regard, when the direction of current through the push-pull amplifiers 118A, 118B reverses, voltage drop over the push-pull amplifiers 118A, 118B also reverses; and as the excitation coil 108 is inductive, the current lags the applied voltage. The compensation network may bring the current in phase with the voltage and thereby reduce if not eliminate the resulting distortion. The compensation circuit in some examples may operate at resonance with the excitation coil; and in these examples, the compensation circuit may be referred to as a resonant compensation circuit.

Figure 2:
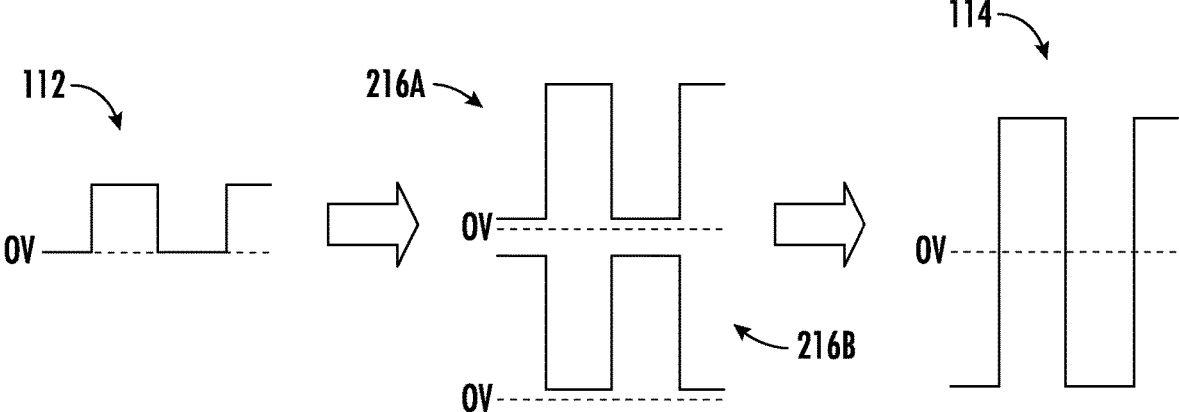
FIG. 2 illustrates unipolar and bipolar square wave signals, according to some example implementations.

One example of a suitable unipolar square wave signal 112 is a pulse-width modulation (PWM) signal, which may be provided with a 50% duty cycle. FIG. 2 further illustrates the unipolar square wave signal 112 and the bipolar square wave signal 114, which bipolar square wave signal 114 may be amplified relative to the unipolar square wave signal 112. In some examples, the bipolar square wave signal 114 includes pulses that alternate in amplitude between a first supply rail and a second supply rail. As also shown, in some examples, the bipolar square wave signal may be output as a differential pair of signals 216A, 216B for input to respective ends of the excitation coil 108 of the transformer-based measuring device 102.

Returning to FIG. 1A, the excitation coil 108 may be driven to generate an alternating magnetic field and induce output signals in the plurality of sensing coils 110 that vary according to a position of the object 106. In this regard, the excitation coil 108 may be magnetically coupled to the sensing coils 110. In some configurations of the transformer-based measuring device 102, such as in the case of a LVDT that includes a core, the core may be ferromagnetic, and the excitation coil may be magnetically coupled through the ferromagnetic core to the sensing coils.

Figure 1B:
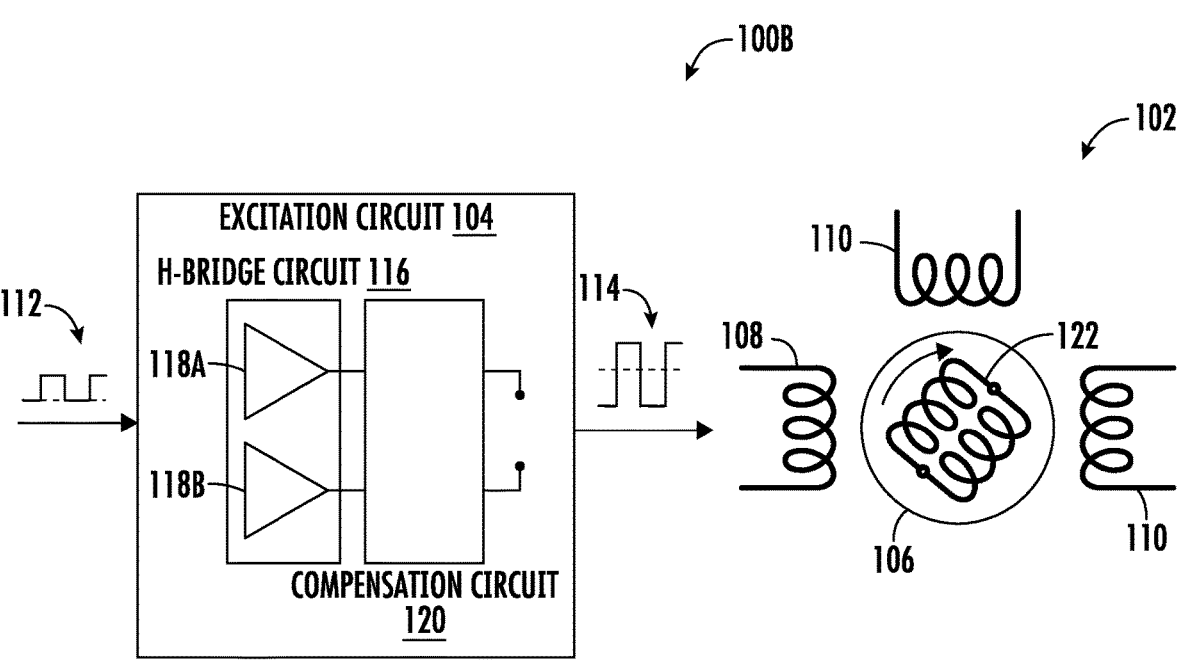
FIG. 1B is a block diagram of a position sensor similar to the position sensor shown in FIG. 1A, and including a rotor coil, according to some example implementations.

In some configurations of the transformer-based measuring device 102, such as in the case of a resolver that includes a rotor, the excitation coil 108 may be located on the rotor, and the plurality of sensing coils 110 may be stationary relative to the rotor that moves with the object 106 (e.g., for a resolver, the plurality of sensing coils 110 may located on a stator that the rotor revolves within). In other configurations, as shown in FIG. 1B for a position sensor 100B, the transformer-based measuring device 102 may include a rotor coil 122, and the excitation coil 108 and plurality of sensing coils 110 may all be stationary relative to the rotor coil 122 (e.g., located on the stator). The excitation coil 108 may be magnetically coupled through the rotor coil 122 to the sensing coils 110. The alternating magnetic field generated by the excitation coil 108 may therefore induce current in the rotor coil 122 that causes a secondary, alternating magnetic field and induces the output signals in the plurality of sensing coils 110.

Figure 1C:
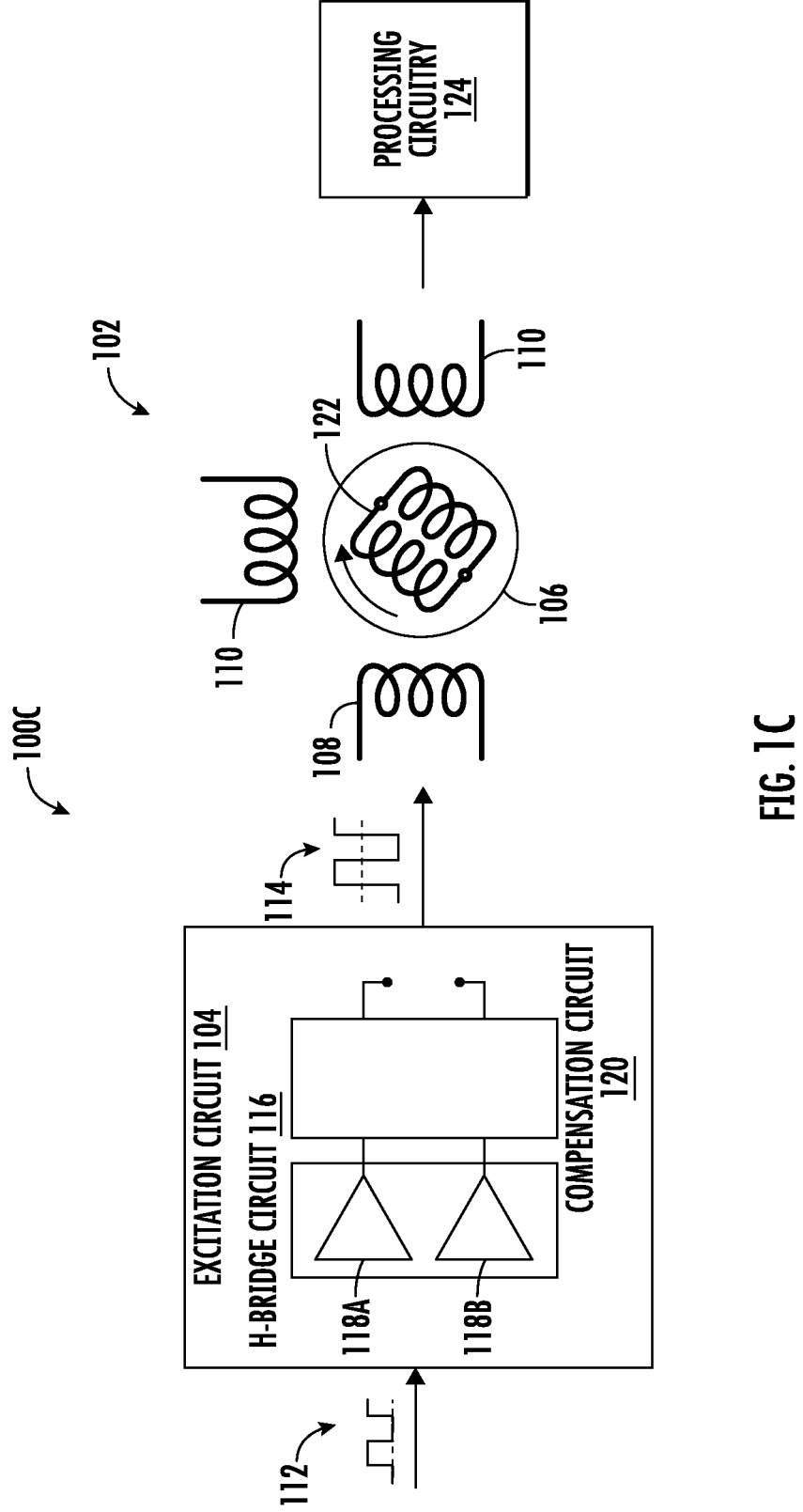
FIG. 1C is a block diagram of a position sensor similar to the position sensor shown in FIG. 1A, and including processing circuitry, according to some example implementations.

FIG. 1C is a block diagram of a position sensor 100C similar to the position sensor 100A shown in FIG. 1A, and including processing circuitry 124, according to some example implementations. In some examples, the processing circuitry 124 may process the output signals from the plurality of sensing coils 110 to determine the position of the object 106 to which the transformer-based measuring device 102 is connectable. In various examples, the processing circuitry 124 may include demodulation circuitry, signal conditioning circuitry, or analog-to-digital converters (ADCs), without limitation. The processing circuitry 124 may also include a general or specific-purpose processor, microprocessor, controller, or microcontroller, without limitation.

Figure 3:
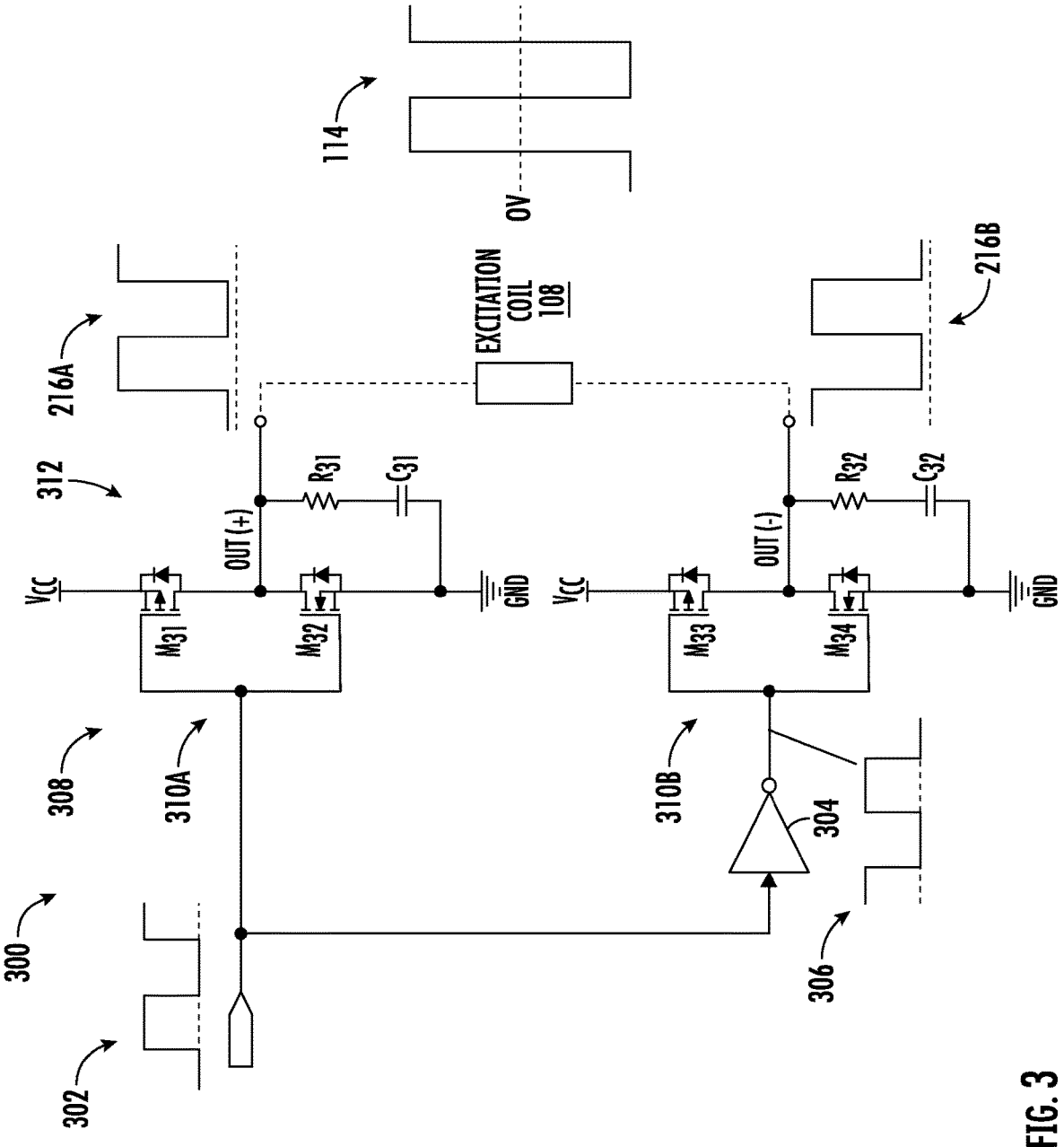
FIG. 3 illustrates an excitation circuit that may correspond to the excitation circuit of FIG. 1, according to some example implementations.

FIG. 3 illustrates an excitation circuit 300 that may correspond to the excitation circuit 104 of FIG. 1, according to some example implementations. As shown, the unipolar square wave signal 112 may be a first unipolar square wave signal 302, and the excitation circuit 300 may include a polarity inverter 304 to convert the first unipolar square wave signal 302 to a second unipolar square wave signal 306 that is opposite the first unipolar square wave signal 302 in polarity. The excitation circuit 300 may also optionally include a buffer at an input to H-bridge circuit 308 to match the timing, i.e. phase, between the first unipolar square wave signal 302 and the second unipolar square wave signal 306.

As also shown, the excitation circuit 300 includes an H-bridge circuit 308 to convert the first unipolar square wave signal 302 and the second unipolar square wave signal 306 to a bipolar square wave signal 114 to drive the excitation coil 108 of the transformer-based measuring device 102 (not shown). The H-bridge circuit 308 may include a first push-pull amplifier 310A and a second push-pull amplifier 310B arranged in two legs. The first push-pull amplifier 310A may be driven by the first unipolar square wave signal 302, and the second push-pull amplifier 310B may be driven by the second unipolar square wave signal 306. The excitation circuit 300 may also include a compensation circuit 312 coupled between the two legs of the H-bridge circuit 308. In this regard, the compensation circuit 312 may compensate for any distortion in the bipolar square wave 114 signal caused by the excitation coil 108 as an inductive load on the H-bridge circuit 308.

In some examples, respective ones of the first push-pull amplifier 310A and the second push-pull amplifier 310B includes a complementary pair of transistors connected in a push-pull configuration. Gates of the complementary pair of transistors of the first push-pull amplifier 310A are driven by the first unipolar square wave signal 302, and the gates of the complementary pair of transistors of the second push-pull amplifier 310B are driven by the second unipolar square wave signal 306. The first push-pull amplifier 310A and the second push-pull amplifier 310B may output respective signals of the differential pair of signals 216A and 216B so as to form bipolar square wave signal 114.

As shown in some more particular examples, the first push-pull amplifier 310A includes complementary pair of transistors $M_{31}$, $M_{32}$, and the second push-pull amplifier 310B includes complementary pair of transistors $M_{33}$, $M_{34}$. The complementary pair of transistors for respective ones of the first and second push-pull amplifiers 310A, 310B includes a respective high-side transistor $M_{31}$/$M_{33}$ to couple the excitation coil to a first supply rail $V_{CC}$, and a respective low-side transistor $M_{32}$/$M_{34}$ to couple the excitation coil to a second supply rail, denoted as GND. The complementary pair of transistors may be transistors of any of a number of different types. In the illustrated example, the transistors are metal-oxide-semiconductor field-effect transistors (MOS-FETs). In particular, the respective high-side transistors $M_{31}/M_{33}$ are a p-type MOSFET, and the respective low-side transistors $M_{32}/M_{34}$ are an n-type MOSFET.

Figure 4:
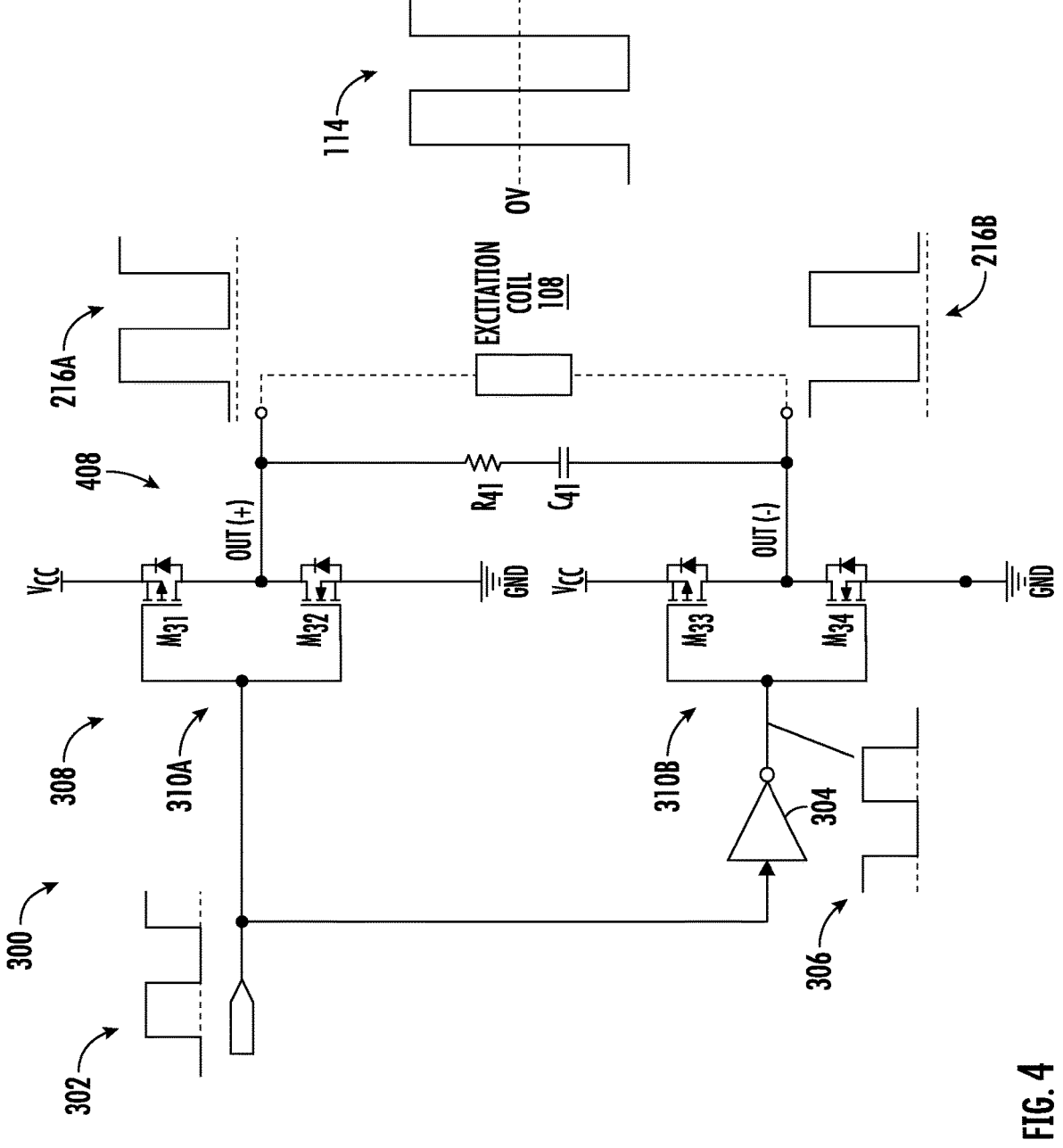
FIG. 4 illustrates the excitation circuit of FIG. 3 with another implementation of the compensation circuit, according to some example implementations.

In some examples, the compensation circuit includes a first compensation circuit $R_{31}$, $C_{31}$ coupled to an output of the first push-pull amplifier 310A, and a second compensation circuit $R_{32}$, $C_{32}$ coupled to the output of the second push-pull amplifier 206B. In the non-limiting example shown, a first end of resistor $R_{31}$ is coupled to the output of the first push-pull amplifier 310A, and a second end resistor $R_{31}$ is coupled through capacitor $C_{31}$ to the second supply rail, GND. Similarly, a first end of resistor $R_{32}$ is coupled to the output of the second push-pull amplifier 310B, and a second end resistor $R_{32}$ is coupled through capacitor $C_{32}$ to the second supply rail, GND. Thus, first compensation circuit $R_{31}$, $C_{31}$ and second compensation circuit $R_{32}$, $C_{32}$ are coupled through the second supply rail between the two legs of the H-bridge circuit 308. In other examples, as shown in FIG. 4, compensation circuit 408 comprises $R_{41}$, $C_{41}$ coupled between outputs of the first push-pull amplifier 310A and the second push-pull amplifier 310B. In the non-limiting example shown in FIG. 4, resistor $R_{41}$ and capacitor $C_{41}$ are coupled in series between outputs of the first push-pull amplifier 310A and the second push-pull amplifier 310B. The compensation circuit 408 is shown as a resistor-capacitor (RC) circuit. It should be understood, however, that the compensation circuit 408 may be implemented in a number of different manners.

In some examples, the polarity inverter 304 and H-bridge circuit 308 are embodied by a gate drive circuit including a non-inverting gate driver that includes the first push-pull amplifier 310A, and an inverting gate driver that includes the polarity inverter and the second push-pull amplifier 310B. In some of these examples, the gate drive circuit may output the bipolar square wave signal 114 as the differential pair of signals 216A, 216B that are output by respective ones of the non-inverting gate driver and the inverting gate driver of the gate drive circuit.

Figure 5:
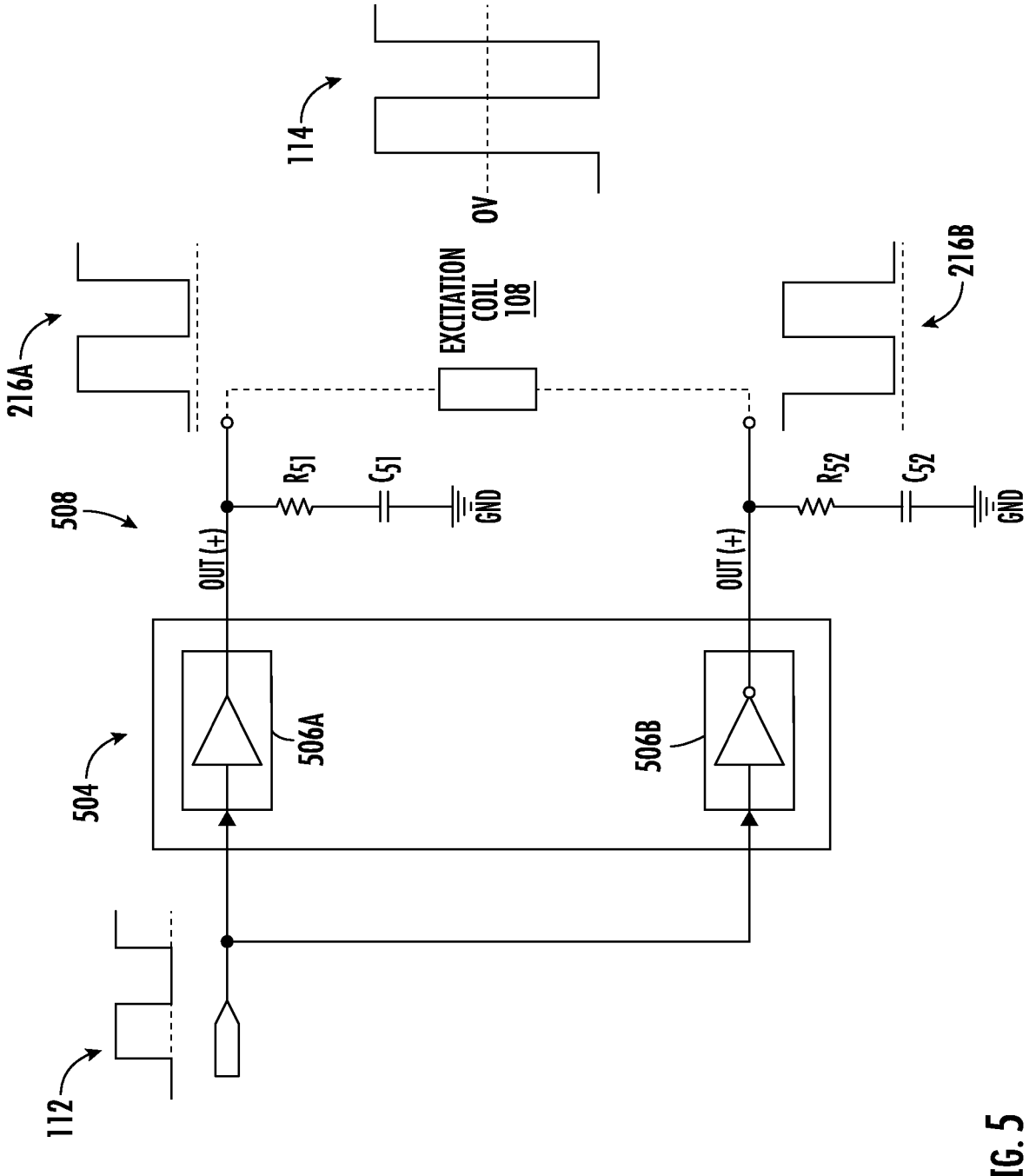
FIG. 5 illustrates an excitation circuit that may correspond to the excitation circuit of FIG. 1, in which the H-bridge circuit is embodied by a gate drive circuit, according to some example implementations.
Figure 6:
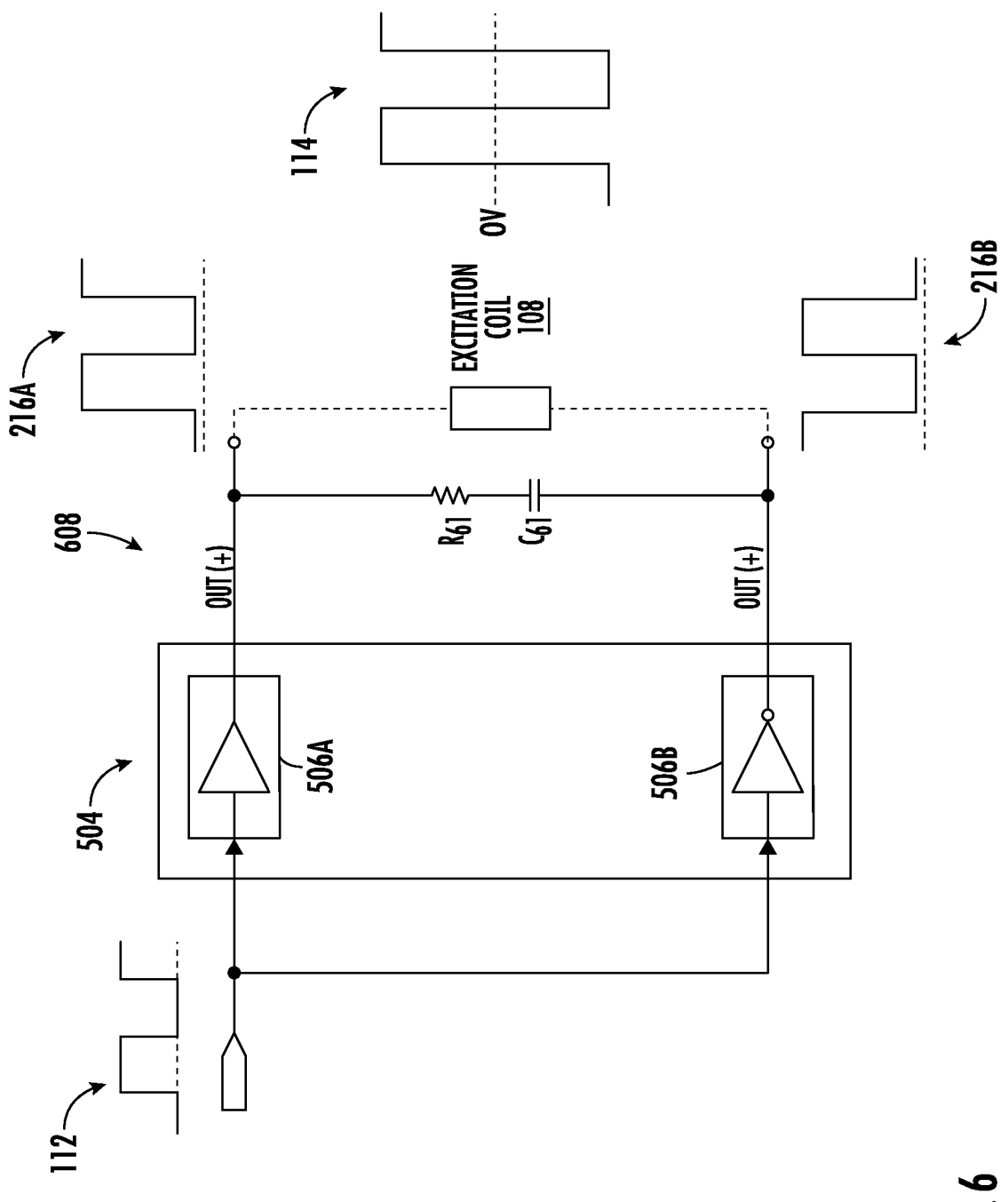
FIG. 6 illustrates the excitation circuit of FIG. 5 with another implementation of the compensation circuit, according to some example implementations.

FIGS. 5 and 6 illustrate examples in which the excitation circuit includes a gate drive circuit 504 with a non-inverting gate driver 506A and an inverting gate driver 506B, which output respective ones of the differential pair of signals 216A, 216B. Some examples of a suitable gate driver circuit are the following power MOSFET drivers from Microchip Technology Inc., of Chandler, Arizona, all of which include a non-inverting gate driver and an inverting gate driver: TC4425A, TC4428A, MIC4425, MIC4128, MIC4428, MCP14E8, MCP14A0305, MCP14E5, MCP14E5, MCP14A0455, MCP1405A and MCP4225. Other examples of a suitable gate driver circuit include TC1412N and MCP14A0152 power MOSFET drivers available from Microchip Technology Inc. that include a non-inverting gate driver, and TC1412 and MCP14A0151 power MOSFET drivers that include an inverting gate driver, also available from Microchip Technology Inc.

Figure 7:
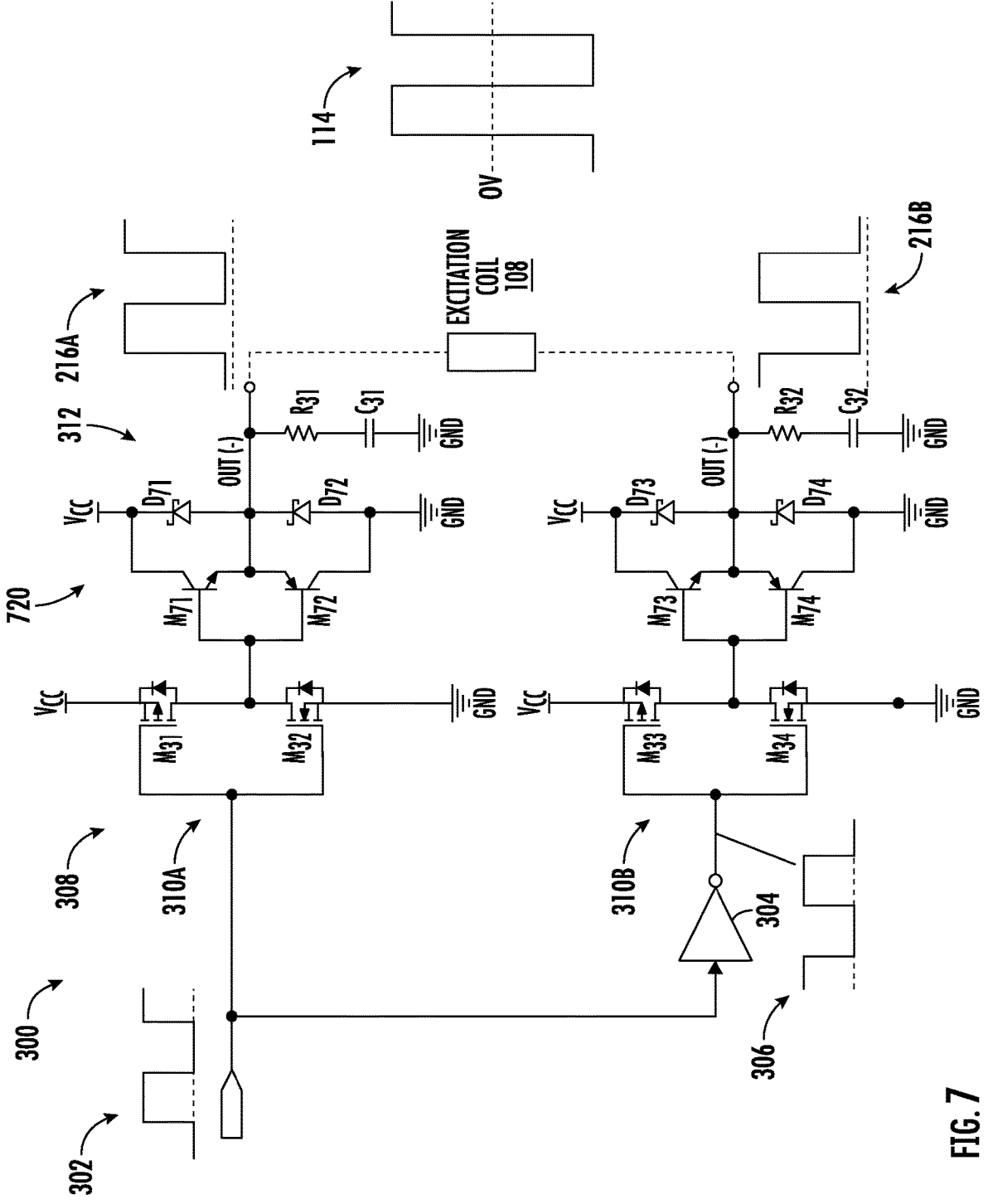
FIGS. 7, 8, 9 and 10 illustrate the excitation circuits of FIGS. 3, 4, 5 and 6, respectively, in which the excitation circuit includes a voltage follower circuit, according to some example implementations.
Figure 8:
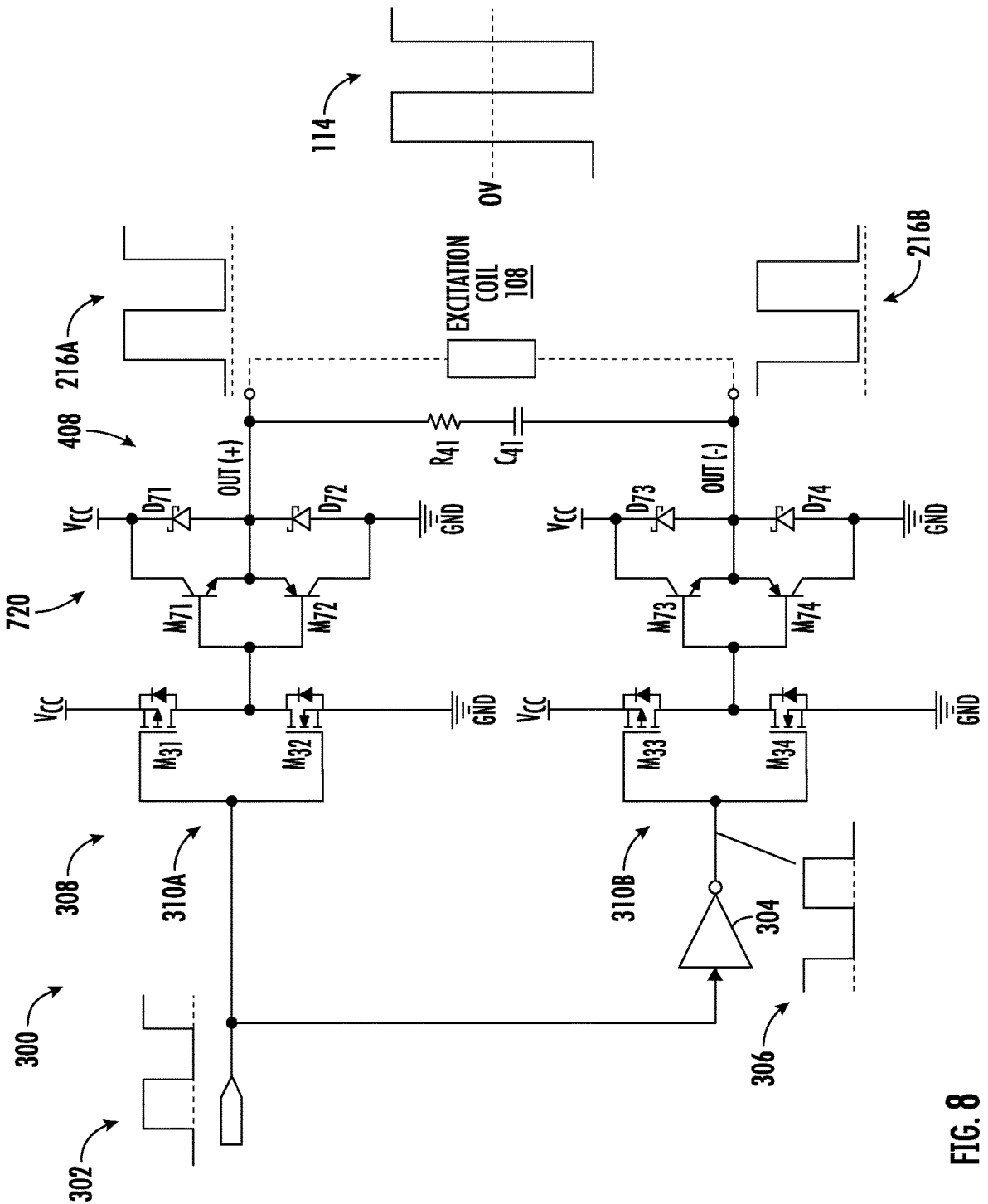

In some examples, the excitation circuit 104 includes a voltage buffer such as a voltage follower circuit to transfer the bipolar square wave signal 114 from the H-bridge circuit 116 to the compensation circuit 120. In FIGS. 7 and 8, for example, the excitation circuit includes a voltage follower circuit 720 to transfer the bipolar square wave signal from the H-bridge circuit 308 to the compensation circuit 312, 408, respectively. And in FIGS. 9 and 10, for example, the excitation circuit includes the voltage follower circuit 720 to transfer the bipolar square wave signal from the gate drive circuit 504 to the compensation circuit 508, 608.

Figure 9:
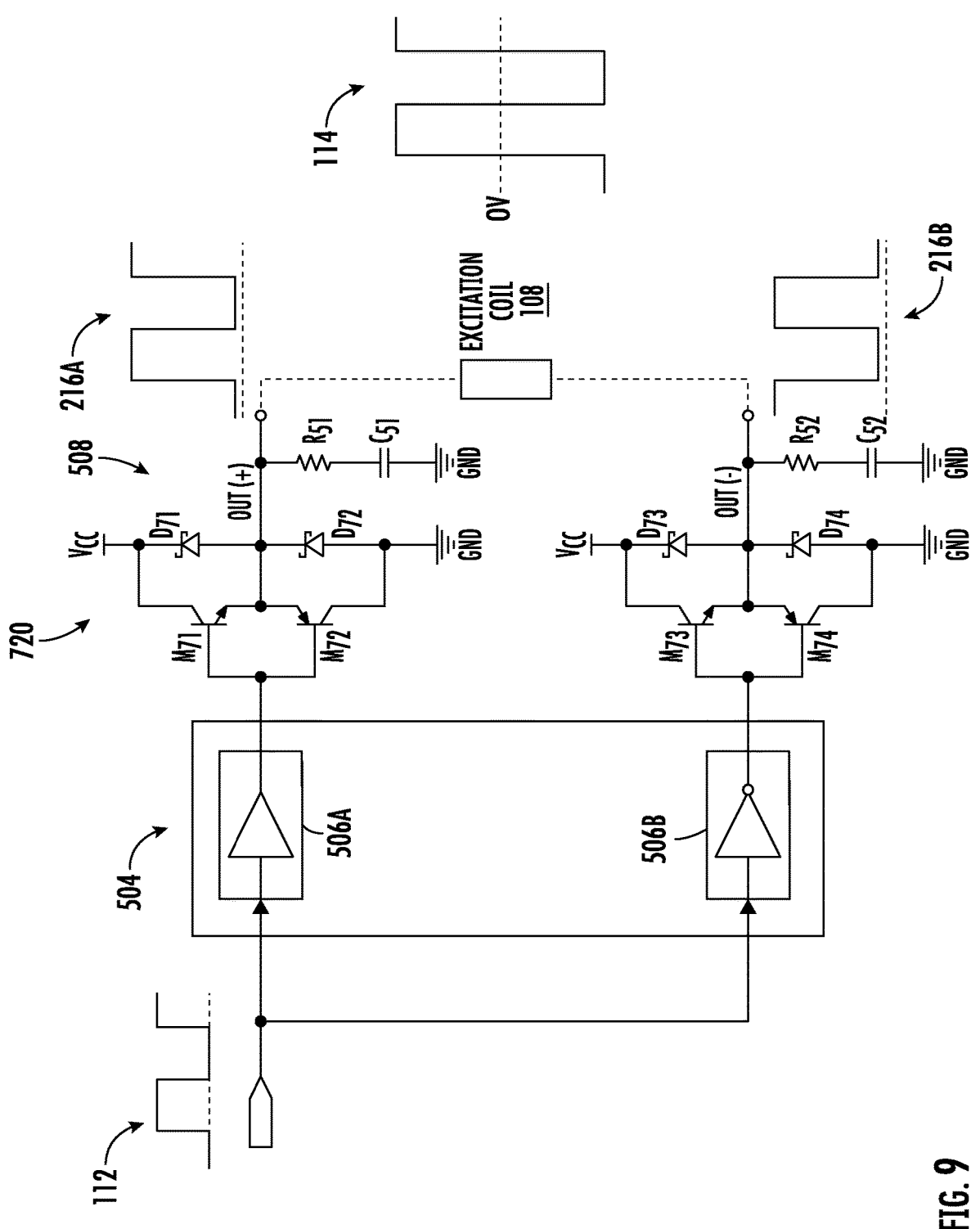
Figure 10:
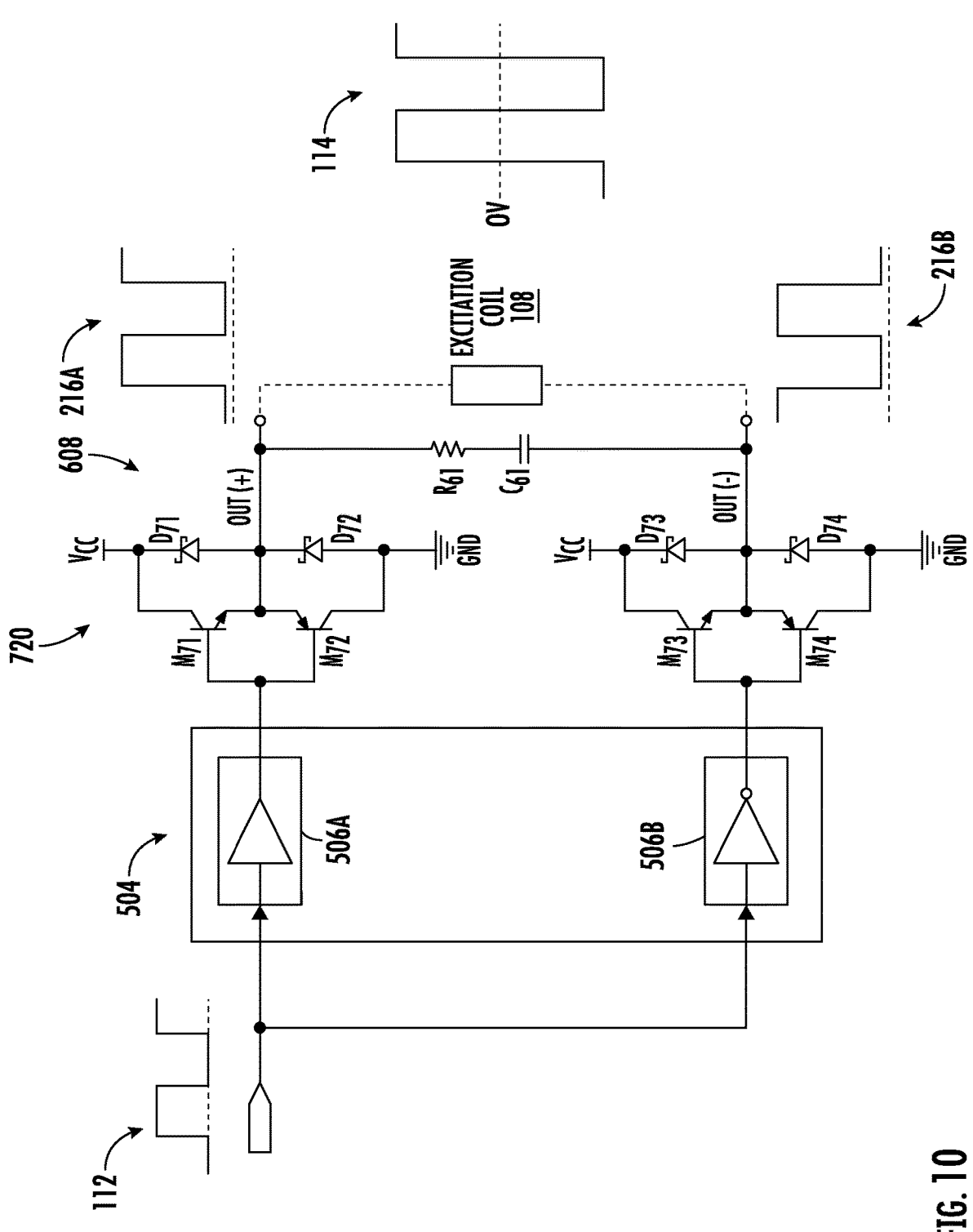

In FIGS. 7-10, according to some examples, the voltage follower circuit 720 includes a pair of transistors and diodes for respective ones of the first and second push-pull amplifiers 310A, 310B (FIGS. 7 and 8) or non-inverting and inverting gate drivers 506A, 506B (FIGS. 9 and 10). In particular, the voltage follower circuit 720 includes transistors $M_{71}$, $M_{72}$ and breakdown diodes $D_{71}$, $D_{72}$ for the first push-pull amplifier 310A/non-inverting gate driver 506A, and transistors $M_{73}$, $M_{74}$ and breakdown diodes $D_{73}$, $D_{74}$ for the second push-pull amplifier 310B/non-inverting gate driver 506B. As shown, the transistors are implemented with bipolar junction transistors (BJTs). It should be noted, however, that the voltage follower circuit may be implemented in a number of different manners.

FIGS. 11A and 11B are flowcharts of a method 1100 according to various example implementations. The method includes converting a unipolar square wave signal to a bipolar square wave signal to drive a an excitation coil, as shown at block 1102 of FIG. 11A.

Converting the unipolar square wave signal includes applying the unipolar square wave signal to an H-bridge circuit with push-pull amplifiers arranged in two legs, the H-bridge circuit converting the unipolar square wave signal to the bipolar square wave signal, as shown at block 1104. Converting the unipolar square wave signal also includes compensating for distortion in the bipolar square wave signal caused by the excitation coil as an inductive load on the H-bridge circuit, as shown at block 1106.

In some examples, the excitation coil is of a transformer-based measuring device connected to an object that is moving, and that includes a plurality of sensing coils. The bipolar square wave signal drives the excitation coil to generate an alternating magnetic field and induce output signals in the plurality of sensing coils that vary according to a position of the object. In some of these examples, the method 1100 includes processing the output signals to determine the position of the object, as shown at block 1108 of FIG. 11B.

In some examples, the unipolar square wave signal is a first unipolar square wave signal, and converting the unipolar square wave signal at block 1102 includes converting the first unipolar square wave signal to a second unipolar square wave signal that is opposite the first unipolar square wave signal in polarity. In some of these examples, the push-pull amplifiers include a first push-pull amplifier driven by the first unipolar square wave signal, and a second push-pull amplifier driven by the second unipolar square wave signal.

In some examples in which the push-pull amplifiers include a first push-pull amplifier and a second push-pull amplifier, the distortion is compensated at block 1106 using a first compensation circuit coupled to an output of the first push-pull amplifier, and a second compensation circuit coupled to the output of the second push-pull amplifier.

In some examples in which the push-pull amplifiers include a first push-pull amplifier and a second push-pull amplifier, the distortion is compensated at block 1106 using a compensation circuit coupled between outputs of the first push-pull amplifier and the second push-pull amplifier.

In some examples, the distortion is compensated at block 1106 using a resistor-capacitor (RC) circuit.

As explained above and reiterated below, the present disclosure includes, without limitation, the following example implementations.

Clause 1. A position sensor comprising: a transformer-based measuring device connectable to an object that is movable, the transformer-based measuring device including an excitation coil and a plurality of sensing coils; and an excitation circuit to convert a unipolar square wave signal to a bipolar square wave signal to drive the excitation coil to generate an alternating magnetic field and induce output signals in the plurality of sensing coils that vary according to a position of the object, the excitation circuit including: an H-bridge circuit including push-pull amplifiers arranged in two legs, the H-bridge circuit to convert the unipolar square wave signal to the bipolar square wave signal; and a compensation circuit coupled between the two legs of the H-bridge circuit, the compensation circuit to compensate for any distortion in the bipolar square wave signal caused by the excitation coil as an inductive load on the H-bridge circuit.

Clause 2. The position sensor of clause 1, wherein the position sensor comprises processing circuitry to process the output signals to determine the position of the object.

Clause 3. The position sensor of clause 1 or clause 2, wherein the transformer-based measuring device is a resolver, the object to which the transformer-based measuring device is connectable is a shaft that is rotatable, and the output signals in the plurality of sensing coils vary according to an angular position of the shaft.

Clause 4. The position sensor of any of clauses 1 to 3, wherein the transformer-based measuring device is a linear variable differential transformer (LVDT) in which the object to which the transformer-based measuring device is connectable is linearly movable, and the output signals in the plurality of sensing coils vary according to a linear position of the object.

Clause 5. The position sensor of any of clauses 1 to 4, wherein the bipolar square wave signal includes pulses that alternate in amplitude between a first supply rail and a second supply rail.

Clause 6. The position sensor of any of clauses 1 to 5, wherein respective ones of the push-pull amplifiers includes a complementary pair of transistors connected in a push-pull configuration.

Clause 7. The position sensor of any of clauses 1 to 6, wherein the unipolar square wave signal is a first unipolar square wave signal, and the excitation circuit includes a polarity inverter to convert the first unipolar square wave signal to a second unipolar square wave signal that is opposite the first unipolar square wave signal in polarity, and wherein the push-pull amplifiers include a first push-pull amplifier driven by the first unipolar square wave signal, and a second push-pull amplifier driven by the second unipolar square wave signal.

Clause 8. The position sensor of clause 7, wherein respective ones of the first push-pull amplifier and the second push-pull amplifier includes a complementary pair of transistors connected in a push-pull configuration.

Clause 9. The position sensor of clause 8, wherein gates of the complementary pair of transistors of the first push-pull amplifier are driven by the first unipolar square wave signal, and gates of the complementary pair of transistors of the second push-pull amplifier are driven by the second unipolar square wave signal.

Clause 10. The position sensor of clause 8 or clause 9, wherein the complementary pair of transistors includes a high-side transistor to couple the excitation coil to a first supply rail, and a low-side transistor to couple the excitation coil to a second supply rail.

Clause 11. The position sensor of any of clauses 1 to 10, wherein the H-bridge circuit is to output the bipolar square wave signal as a differential pair of signals for input to respective ends of the excitation coil.

Clause 12. The position sensor of clause 11, wherein the push-pull amplifiers output respective ones of the differential pair of signals.

Clause 13. The position sensor of any of clauses 1 to 12, wherein the push-pull amplifiers include a first push-pull amplifier and a second push-pull amplifier, and wherein the compensation circuit includes a first compensation circuit coupled to an output of the first push-pull amplifier, and a second compensation circuit coupled to the output of the second push-pull amplifier.

Clause 14. The position sensor of any of clauses 1 to 13, wherein the push-pull amplifiers include a first push-pull amplifier and a second push-pull amplifier, and wherein the compensation circuit is coupled between outputs of the first push-pull amplifier and the second push-pull amplifier.

Clause 15. The position sensor of any of clauses 1 to 14, wherein the excitation circuit comprises a voltage buffer to transfer the bipolar square wave signal from the H-bridge circuit to the compensation circuit.

Clause 16. The position sensor of clause 15, wherein the voltage buffer is a voltage follower circuit.

Clause 17. The position sensor of any of clauses 1 to 16, wherein the push-pull amplifiers include a first push-pull amplifier and a second push-pull amplifier, and wherein the H-bridge circuit is embodied by a gate drive circuit including a non-inverting gate driver that includes the first push-pull amplifier, and an inverting gate driver that includes the second push-pull amplifier.

Clause 18. The position sensor of clause 17, wherein the gate drive circuit is to output the bipolar square wave signal as a differential pair of signals that are output by respective ones of the non-inverting gate driver and the inverting gate driver.

Clause 19. The position sensor of any of clauses 1 to 18, wherein the compensation circuit is a resistor-capacitor (RC) circuit.

Clause 20. An excitation circuit comprising: an H-bridge circuit to convert a unipolar square wave signal to a bipolar square wave signal to drive an excitation coil of a transformer-based measuring device, the H-bridge circuit including push-pull amplifiers arranged in two legs; and a compensation circuit coupled between the two legs of the H-bridge circuit, the compensation circuit to compensate for any distortion in the bipolar square wave signal caused by the excitation coil as an inductive load on the H-bridge circuit.

Clause 21. The excitation circuit of clause 20, wherein the transformer-based measuring device is a resolver.

Clause 22. The excitation circuit of clause 20 or clause 21, wherein the transformer-based measuring device is a linear variable differential transformer (LVDT).

Clause 23. The excitation circuit of any of clauses 20 to 22, wherein the bipolar square wave signal includes pulses that alternate in amplitude between a first supply rail and a second supply rail.

Clause 24. The excitation circuit of any of clauses 20 to 23, wherein respective ones of the push-pull amplifiers includes a complementary pair of transistors connected in a push-pull configuration.

Clause 25. The excitation circuit of any of clauses 20 to 24, wherein the unipolar square wave signal is a first unipolar square wave signal, and the excitation circuit includes a polarity inverter to convert the first unipolar square wave signal to a second unipolar square wave signal that is opposite the first unipolar square wave signal in polarity, and wherein the push-pull amplifiers include a first push-pull amplifier driven by the first unipolar square wave signal, and a second push-pull amplifier driven by the second unipolar square wave signal.

Clause 26. The excitation circuit of clause 25, wherein respective ones of the first push-pull amplifier and the second push-pull amplifier includes a complementary pair of transistors connected in a push-pull configuration.

Clause 27. The excitation circuit of clause 26, wherein gates of the complementary pair of transistors of the first push-pull amplifier are driven by the first unipolar square wave signal, and gates of the complementary pair of transistors of the second push-pull amplifier are driven by the second unipolar square wave signal.

Clause 28. The excitation circuit of clause 26 or clause 27, wherein the complementary pair of transistors includes a high-side transistor to couple the excitation coil to a first supply rail, and a low-side transistor to couple the excitation coil to a second supply rail.

Clause 29. The excitation circuit of any of clauses 20 to 28, wherein the H-bridge circuit is to output the bipolar square wave signal as a differential pair of signals for input to respective ends of the excitation coil.

Clause 30. The excitation circuit of clause 29, wherein the push-pull amplifiers output respective ones of the differential pair of signals.

Clause 31. The excitation circuit of any of clauses 20 to 30, wherein the push-pull amplifiers include a first push-pull amplifier and a second push-pull amplifier, and wherein the compensation circuit includes a first compensation circuit coupled to an output of the first push-pull amplifier, and a second compensation circuit coupled to the output of the second push-pull amplifier.

Clause 32. The excitation circuit of any of clauses 20 to 31, wherein the push-pull amplifiers include a first push-pull amplifier and a second push-pull amplifier, and wherein the compensation circuit is coupled between outputs of the first push-pull amplifier and the second push-pull amplifier.

Clause 33. The excitation circuit of any of clauses 20 to 32, wherein the excitation circuit comprises a voltage buffer to transfer the bipolar square wave signal from the H-bridge circuit to the compensation circuit.

Clause 34. The excitation circuit of clause 33, wherein the voltage buffer is a voltage follower circuit.

Clause 35. The excitation circuit of any of clauses 20 to 34, wherein the push-pull amplifiers include a first push-pull amplifier and a second push-pull amplifier, and wherein the H-bridge circuit is embodied by a gate drive circuit including a non-inverting gate driver that includes the first push-pull amplifier, and an inverting gate driver that includes the second push-pull amplifier.

Clause 36. The excitation circuit of clause 35, wherein the gate drive circuit is to output the bipolar square wave signal as a differential pair of signals that are output by respective ones of the non-inverting gate driver and the inverting gate driver.

Clause 37. The excitation circuit of any of clauses 20 to 36, wherein the compensation circuit is a resistor-capacitor (RC) circuit.

Clause 38. An excitation circuit comprising: a gate drive circuit to convert a unipolar square wave signal to a bipolar square wave signal to drive an excitation coil of a transformer-based measuring device, the gate drive circuit including a non-inverting gate driver and an inverting gate driver that are arranged in two legs to implement an H-bridge circuit; and a compensation circuit coupled between the two legs of the H-bridge circuit, the compensation circuit to compensate for any distortion in the bipolar square wave signal caused by the excitation coil as an inductive load on the H-bridge circuit.

Clause 39. The excitation circuit of clause 38, wherein the bipolar square wave signal includes pulses that alternate in amplitude between a first supply rail and a second supply rail.

Clause 40. The excitation circuit of clause 38 or clause 39, wherein the gate drive circuit is to output the bipolar square wave signal as a differential pair of signals that are output by respective ones of the non-inverting gate driver and the inverting gate driver.

Clause 41. The excitation circuit of any of clauses 38 to 40, wherein the non-inverting gate driver includes a first push-pull amplifier, and the inverting gate driver includes a polarity inverter and a second push-pull amplifier.

Clause 42. The excitation circuit of clause 41, wherein the unipolar square wave signal is a first unipolar square wave signal, and the polarity inverter is to convert the first unipolar square wave signal to a second unipolar square wave signal that is opposite the first unipolar square wave signal in polarity, and wherein the first push-pull amplifier is driven by the first unipolar square wave signal, and the second push-pull amplifier is driven by the second unipolar square wave signal.

Clause 43. The excitation circuit of clause 41 or clause 42, wherein respective ones of the first push-pull amplifier and the second push-pull amplifier includes a complementary pair of transistors connected in a push-pull configuration.

Clause 44. The excitation circuit of clause 43, wherein gates of the complementary pair of transistors of the first push-pull amplifier are driven by the first unipolar square wave signal, and gates of the complementary pair of transistors of the second push-pull amplifier are driven by the second unipolar square wave signal.

Clause 45. The excitation circuit of clause 43 or clause 44, wherein the complementary pair of transistors includes a high-side transistor to couple the excitation coil to a first supply rail, and a low-side transistor to couple the excitation coil to a second supply rail.

Clause 46. The excitation circuit of any of clauses 38 to 45, wherein the H-bridge circuit is to output the bipolar square wave signal as a differential pair of signals for input to respective ends of the excitation coil.

Clause 47. The excitation circuit of clause 46, wherein the non-inverting gate driver and the inverting gate driver are to output respective ones of the differential pair of signals.

Clause 48. The excitation circuit of any of clauses 38 to 47, wherein the compensation circuit includes a first compensation circuit coupled to an output of the non-inverting gate driver, and a second compensation circuit coupled to the output of the inverting gate driver.

Clause 49. The excitation circuit of any of clauses 38 to 48, wherein the compensation circuit is coupled between outputs of the non-inverting gate driver and the inverting gate driver.

Clause 50. The excitation circuit of any of clauses 38 to 49, wherein the excitation circuit comprises a voltage buffer to transfer the bipolar square wave signal from the H-bridge circuit to the compensation circuit.

Clause 51. The excitation circuit of clause 50, wherein the voltage buffer is a voltage follower circuit.

Clause 52. The excitation circuit of any of clauses 38 to 51, wherein the compensation circuit is a resistor-capacitor (RC) circuit.

Clause 53. A method comprising: converting a unipolar square wave signal to a bipolar square wave signal to drive an excitation coil, converting the unipolar square wave signal including: applying the unipolar square wave signal to an H-bridge circuit with push-pull amplifiers arranged in two legs, the H-bridge circuit converting the unipolar square wave signal to the bipolar square wave signal; and compensating for distortion in the bipolar square wave signal caused by the excitation coil as an inductive load on the H-bridge circuit.

Clause 54. The method of clause 53, wherein the excitation coil is of a transformer-based measuring device connected to an object that is moving, and that includes a plurality of sensing coils, the bipolar square wave signal driving the excitation coil to generate an alternating magnetic field and induce output signals in the plurality of sensing coils that vary according to a position of the object, and wherein the method comprises processing the output signals to determine the position of the object.

Clause 55. The method of clause 54, wherein the transformer-based measuring device is a resolver, the object to which the transformer-based measuring device is connected is a shaft that is rotating, and the output signals in the plurality of sensing coils vary according to an angular position of the shaft.

Clause 56. The method of clause 54 or clause 55, wherein the transformer-based measuring device is a linear variable differential transformer (LVDT) in which the object to which the transformer-based measuring device is connected is linearly moving, and the output signals in the plurality of sensing coils vary according to a linear position of the object.

Clause 57. The method of any of clauses 53 to 56, wherein the bipolar square wave signal includes pulses that alternate in amplitude between a first supply rail and a second supply rail.

Clause 58. The method of any of clauses 53 to 57, wherein respective ones of the push-pull amplifiers includes a complementary pair of transistors connected in a push-pull configuration.

Clause 59. The method of any of clauses 53 to 58, wherein the unipolar square wave signal is a first unipolar square wave signal, and converting the unipolar square wave signal includes converting the first unipolar square wave signal to a second unipolar square wave signal that is opposite the first unipolar square wave signal in polarity, and wherein the push-pull amplifiers include a first push-pull amplifier driven by the first unipolar square wave signal, and a second push-pull amplifier driven by the second unipolar square wave signal.

14

Clause 60. The method of clause 59, wherein respective ones of the first push-pull amplifier and the second push-pull amplifier includes a complementary pair of transistors connected in a push-pull configuration.

Clause 61. The method of clause 60, wherein gates of the complementary pair of transistors of the first push-pull amplifier are driven by the first unipolar square wave signal, and gates of the complementary pair of transistors of the second push-pull amplifier are driven by the second unipolar square wave signal.

Clause 62. The method of clause 60 or clause 61, wherein the complementary pair of transistors includes a high-side transistor to couple the excitation coil to a first supply rail, and a low-side transistor to couple the excitation coil to a second supply rail.

Clause 63. The method of any of clauses 53 to 62, wherein the H-bridge circuit outputs the bipolar square wave signal as a differential pair of signals for input to respective ends of the excitation coil.

Clause 64. The method of clause 63, wherein the push-pull amplifiers output respective ones of the differential pair of signals.

Clause 65. The method of any of clauses 53 to 64, wherein the push-pull amplifiers include a first push-pull amplifier and a second push-pull amplifier, and wherein the distortion is compensated using a first compensation circuit coupled to an output of the first push-pull amplifier, and a second compensation circuit coupled to the output of the second push-pull amplifier.

Clause 66. The method of any of clauses 53 to 65, wherein the push-pull amplifiers include a first push-pull amplifier and a second push-pull amplifier, and wherein the distortion is compensated using a compensation circuit coupled between outputs of the first push-pull amplifier and the second push-pull amplifier.

Clause 67. The method of any of clauses 53 to 66, wherein the push-pull amplifiers include a first push-pull amplifier and a second push-pull amplifier, and wherein the H-bridge circuit is embodied by a gate drive circuit including a non-inverting gate driver that includes the first push-pull amplifier, and an inverting gate driver that includes the second push-pull amplifier.

Clause 68. The method of clause 67, wherein the gate drive circuit outputs the bipolar square wave signal as a differential pair of signals that are output by respective ones of the non-inverting gate driver and the inverting gate driver.

Clause 69. The method of any of clauses 53 to 68, wherein the distortion is compensated using a resistor-capacitor (RC) circuit.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A position sensor comprising:
a transformer-based measuring device connected to an object that is movable, the transformer-based measuring device comprising an excitation coil and a plurality of sensing coils; and
an excitation circuit to convert a unipolar square wave signal to a bipolar square wave signal to drive the excitation coil to generate an alternating magnetic field and induce output signals in the plurality of sensing coils that vary according to a position of the object, the excitation circuit comprising:
an H-bridge circuit comprising push-pull amplifiers arranged in two legs, the H-bridge circuit to convert the unipolar square wave signal to the bipolar square wave signal;
a compensation circuit having a single resistor and a single capacitor coupled in series between outputs of a first of the push-pull amplifiers and a second of the push-pull amplifiers of the H-bridge circuit, the compensation circuit to compensate for inductive lag in current in the push-pull amplifiers, wherein the lag causes distortion in the bipolar square wave signal caused by the excitation coil as an inductive load on the H-bridge circuit; and
a voltage buffer to transfer the bipolar square wave signal from the H-bridge circuit to the compensation circuit.

2. The position sensor of claim 1, wherein the position sensor comprises processing circuitry to process the output signals to determine the position of the object.

3. The position sensor of claim 1, wherein the unipolar square wave signal is a first unipolar square wave signal, and the excitation circuit comprises a polarity inverter to convert the first unipolar square wave signal to a second unipolar square wave signal that is opposite the first unipolar square wave signal in polarity, and
wherein the first push-pull amplifier is driven by the first unipolar square wave signal, and the second push-pull amplifier is driven by the second unipolar square wave signal.

4. The position sensor of claim 3, wherein respective ones of the first push-pull amplifier and the second push-pull amplifier comprises a complementary pair of transistors connected in a push-pull configuration.

5. The position sensor of claim 4, wherein gates of the complementary pair of transistors of the first push-pull amplifier are driven by the first unipolar square wave signal, and gates of the complementary pair of transistors of the second push-pull amplifier are driven by the second unipolar square wave signal.

6. The position sensor of claim 4, wherein the complementary pair of transistors comprises a high-side transistor to couple the excitation coil to a first supply rail, and a low-side transistor to couple the excitation coil to a second supply rail.

7. The position sensor of claim 3, wherein the H-bridge circuit is embodied by a gate drive circuit comprising a non-inverting gate driver that comprises the first push-pull amplifier, and an inverting gate driver that comprises the second push-pull amplifier.

8. The position sensor of claim 7, wherein the gate drive circuit is to output the bipolar square wave signal as a differential pair of signals that are output by respective ones of the non-inverting gate driver and the inverting gate driver.

9. The position sensor of claim 1, wherein the compensation circuit is a resistor-capacitor (RC) circuit.

10. An excitation circuit comprising:
an H-bridge circuit to convert a unipolar square wave signal to a bipolar square wave signal to drive an excitation coil of a transformer-based measuring device, the H-bridge circuit comprising push-pull amplifiers arranged in two legs;
a compensation circuit having a single resistor and a single capacitor coupled in series between outputs of a first of the push-pull amplifiers and a second of the push-pull amplifiers of the H-bridge circuit, the compensation circuit to compensate for inductive lag in current in the push-pull amplifiers, wherein the lag causes distortion in the bipolar square wave signal caused by the excitation coil as an inductive load on the H-bridge circuit; and
a voltage buffer to transfer the bipolar square wave signal from the H-bridge circuit to the compensation circuit.

11. The excitation circuit of claim 10, wherein the bipolar square wave signal comprises pulses that alternate in amplitude between a first supply rail and a second supply rail.

12. The excitation circuit of claim 10, wherein respective ones of the push-pull amplifiers comprises a complementary pair of transistors connected in a push-pull configuration.

13. The excitation circuit of claim 10, wherein the unipolar square wave signal is a first unipolar square wave signal, and the excitation circuit comprises a polarity inverter to convert the first unipolar square wave signal to a second unipolar square wave signal that is opposite the first unipolar square wave signal in polarity, and
wherein the first push-pull amplifier is driven by the first unipolar square wave signal, and the second push-pull amplifier is driven by the second unipolar square wave signal.

14. The excitation circuit of claim 13, wherein respective ones of the first push-pull amplifier and the second push-pull amplifier comprise a complementary pair of transistors connected in a push-pull configuration.

15. The excitation circuit of claim 14, wherein gates of the complementary pair of transistors of the first push-pull amplifier are driven by the first unipolar square wave signal, and gates of the complementary pair of transistors of the second push-pull amplifier are driven by the second unipolar square wave signal.

16. The excitation circuit of claim 14, wherein the complementary pair of transistors comprises a high-side transistor to couple the excitation coil to a first supply rail, and a low-side transistor to couple the excitation coil to a second supply rail.

17. The excitation circuit of claim 10, wherein the H-bridge circuit is to output the bipolar square wave signal as a differential pair of signals for input to respective ends of the excitation coil.

18. The excitation circuit of claim 17, wherein the push-pull amplifiers output respective ones of the differential pair of signals.

19. The excitation circuit of claim 10,
wherein the compensation circuit comprises a first compensation circuit coupled to the output of the first push-pull amplifier, and a second compensation circuit coupled to the output of the second push-pull amplifier.

20. The excitation circuit of claim 10,
wherein the H-bridge circuit is embodied by a gate drive circuit comprising a non-inverting gate driver that comprises the first push-pull amplifier, and an inverting gate driver that comprises the second push-pull amplifier.

21. The excitation circuit of claim 20, wherein the gate drive circuit is to output the bipolar square wave signal as a differential pair of signals that are output by respective ones of the non-inverting gate driver and the inverting gate driver.

22. The excitation circuit of claim 10, wherein the compensation circuit is a resistor-capacitor (RC) circuit.

23. A method comprising:

converting a unipolar square wave signal to a bipolar square wave signal to drive an excitation coil, converting the unipolar square wave signal comprising:

applying the unipolar square wave signal to an H-bridge circuit with push-pull amplifiers arranged in two legs, the H-bridge circuit converting the unipolar square wave signal to the bipolar square wave signal;

transferring the bipolar square wave signal from the H-bridge circuit to a compensation circuit through a voltage buffer; and compensating for inductive lag in current in the push-pull amplifiers causing distortion in the bipolar square wave signal caused by the excitation coil as an inductive load on the H-bridge circuit using the compensation circuit, wherein the compensation circuit has a single resistor and a single capacitor coupled in series between outputs of a first of the push-pull amplifiers and a second of the push-pull amplifiers of the H-bridge circuit.

24. The method of claim 23, wherein the excitation coil is of a transformer-based measuring device connected to an object that is moving, and that comprises a plurality of sensing coils, the bipolar square wave signal driving the excitation coil to generate an alternating magnetic field and induce output signals in the plurality of sensing coils that vary according to a position of the object, and wherein the method comprises processing the output signals to determine the position of the object.

25. The method of claim 23, wherein applying the unipolar square wave signal to the H-bridge circuit comprises generating a first unipolar square wave signal and a second unipolar square wave signal of opposite polarity, and driving the first push-pull amplifier with the first unipolar square wave signal and the second push-pull amplifier with the second unipolar square wave signal.

26. The method of claim 23, wherein the compensation circuit is a resistor-capacitor (RC) circuit.

\* \* \* \* \*